April 10, 1956　　　G. I. SCHREIBER　　　2,741,168
CAMERA ASSEMBLY
Filed July 9, 1953　　　　　　　　　　　　2 Sheets-Sheet 1
FIG. 1.　　　FIG. 6.
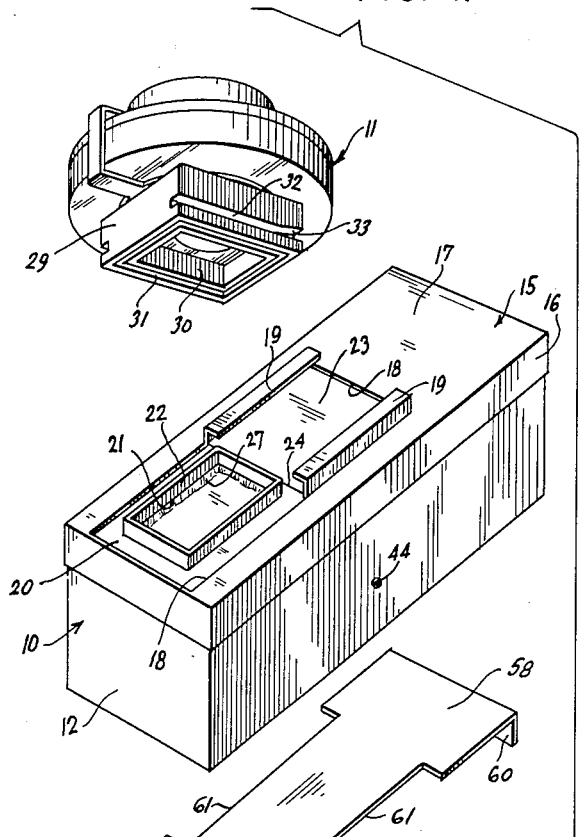
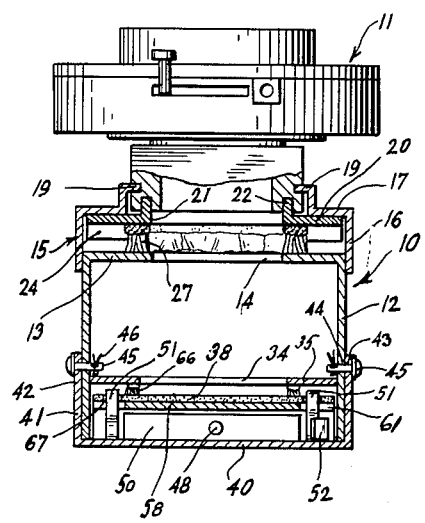
FIG. 2.
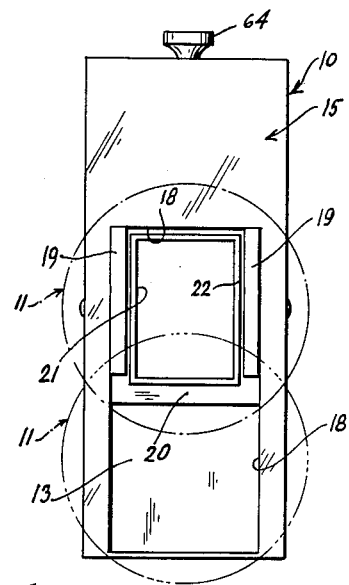
FIG. 3.
INVENTOR
GEORGE I. SCHREIBER
BY Mock + Blum
ATTORNEYS April 10, 1956  G. I. SCHREIBER  2,741,168
CAMERA ASSEMBLY
Filed July 9, 1953  2 Sheets-Sheet 2

INVENTOR
GEORGE I. SCHREIBER
BY Mock & Blum
ATTORNEYS

United States Patent Office 2,741,168
Patented Apr. 10, 1956

2,741,168

CAMERA ASSEMBLY

George I. Schreiber, Asbury Park, N. J.

Application July 9, 1953, Serial No. 366,913

7 Claims. (Cl. 95—11)

The present invention relates to improvements in cameras, and more particularly to a new and improved film casing or magazine which is attachable to a separate lens element to serve as a camera body.

The amateur photographer today is confronted with the problem of being unable to change from one type of film to another once the film is loaded in the camera. For example, if a camera is loaded with color film, it is necessary to expose the entire roll of film before the photographer is able to change over to black-and-white film. The problem is particularly acute in the use of 35 millimeter film, since this film is customarily supplied in rolls of twenty or thirty-six exposures and in which the film cannot be removed or replaced until the entire twenty or thirty-six frames are exposed.

According to the present invention, there is provided a single lens unit and a plurality of film casings each of the latter containing a different type of film. The lens element is adapted to be removably mounted on any one of the film casings at the selection of the photographer, the mounting of the lens element being accomplished simply by sliding it upon the film casing, which sliding movement automatically opens a window in the film casing into communication with the mounted lens element. The film casing then serves as the camera body. When the lens is removed, the film casing is auotmatically sealed against the passage of light thereinto. The photographer can thus mount the same lens element at any time on any of the film casings and can therefore change from color film to black-and-white film or vice versa at will.

The lens unit includes the lens, shutter and diaphragm mechanisms of the camera, and since these are the most expensive parts of any camera, the film casings may be economically manufactured. Each of the film casings are initially loaded to hold a length of film which is provided in roll form without paper backing or the like and without spools or film magazines, thus further decreasing the cost of the assembly. In addition, each film casing is provided with novel and inexpensive film-advancing means, which upon actuation automatically transports the film by one exposure frame and also actuates a mechanism which counts the exposures.

It has been ascertained that many amateur photographers use a camera so seldom that they constantly forget how to load the film in the camera. This problem is eliminated by the present invention in which each film casing is pre-loaded with film, and all that remains for the photographer is merely to operate the film-advancing mechanism. When the film of a film casing is fully exposed, the entire casing is given to a store or sent to a technician for development of the film.

Additional objects and advantages of the invention will be apparent in the course of the following specification when taken in connection with the accompanying drawings, in which:

Fig. 1 is an exploded perspective view showing the components of the camera assembly;

Fig. 2 is a top plan view of the film casing with its closure member shown in open position and the relative positions of the lens element in open and closed positions being shown in phantom;

Fig. 3 is a bottom plan view of a portion of the film casing showing the aperture for viewing the exposure numerals on the exposure counter disc, the latter and its actuating mechanism being shown in broken line;

Fig. 6 is a section taken along line 6—6 of Fig. 5.

Figure 4:
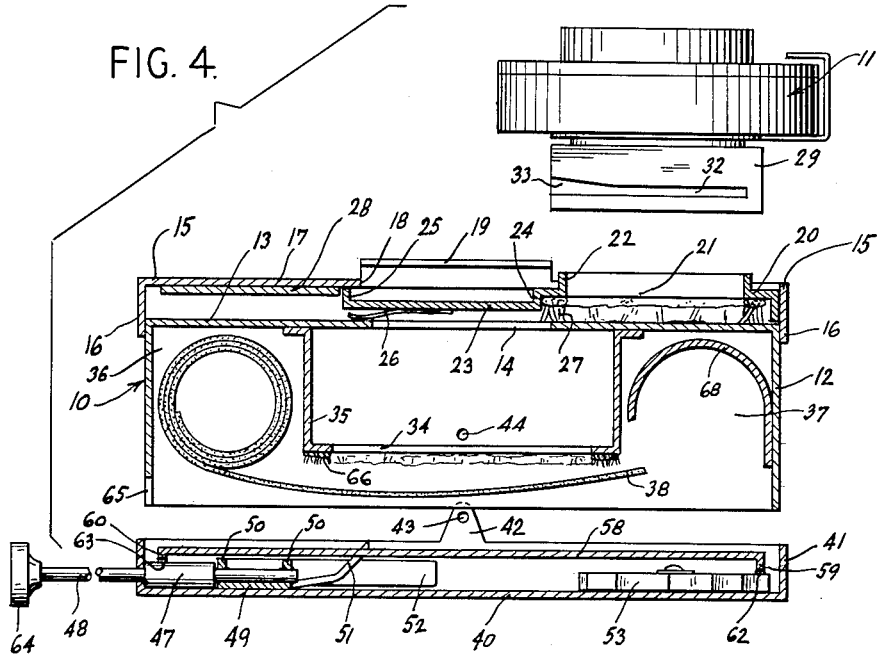
Fig. 4 is an exploded longitudinal section showing the film casing with its rear cover removed and with the lens elements about to be inserted thereupon.

In the drawings, the camera of the invention generally comprises a film casing or magazine 10 and a removable lens element 11.

Figure 5:
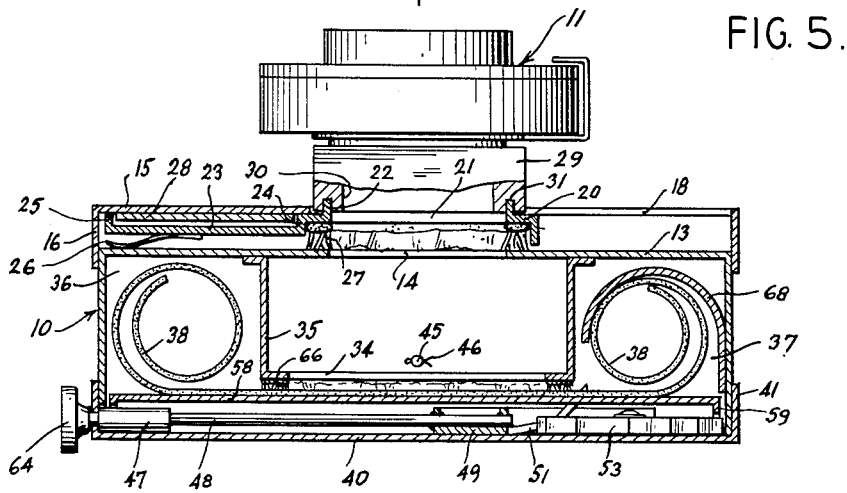
Fig. 5 is a similar longitudinal section showing the lens element and rear cover inserted on said film casing, the camera assembly being ready for operation.

The film casing 10 also serves as the camera body and has a housing 12 which is preferably of rectangular shape and is made of thin sheet metal or the like, the inner surfaces of which are blackened to avoid light reflection. As shown in Figs. 4, 5, and 6, the front wall of housing 12 has a small rectangular opening 14 to permit the entrance of the picture image into the film casing.

A lid 15 is mounted on the front of the housing 12, the lid 15 having a skirt or flange 16 which is secured around the side walls of the housing 12 as by welding. The lid has a front wall 17 which serves as the front wall of the film casing 10 and is located forwardly of the housing front wall 13 and spaced therefrom.

The front wall 17 of lid 15 contains an elongated longitudinally-extending opening 18 which extends from one edge of said front wall 17 to a short distance beyond the rectangular opening 14 of housing front wall 13. The inner portion of said opening 18 is bordered by a pair of forwardly-extending guide flanges 19 of inverted L-shape.

A closure member 20 is mounted for longitudinal sliding movement between the spaced front walls 14 and 18. As shown in Fig. 6 this closure member 20 is sufficiently wide to extend the width of the film casing 10 and to prevent it from being removed through the opening 18. As shown in Fig. 4, the closure member 20 is slightly longer than the opening 18 so that it can completely cover said opening. The closure member 20 has a rectangular window or opening 21 which is approximately the same size as the opening 14 of housing front wall 13, and is positioned to register with said opening 14 when the closure member 20 is brought to its operative position, as will be presently described. The window 21 is bordered around its entire periphery by an upstanding rectangular flange 22.

As shown in Figs. 4 and 5, the closure member 20 has a terminal plate-like portion 23 located inwardly of the window 21 and stepped downwardly below the plane of the remainder of said closure member 20, to form an upstanding lateral shoulder 24. An upstanding flange 25 extends along the terminal edge of this plate-like portion 23, the flange 25 being biased against the inner surface of the front wall 17 of lid 15 by a leaf spring 26. This spring 26 is mounted on the under surface of the closure member terminal portion 23 so that its free end slidably abuts the outer surface of housing front wall 13. Under the biasing force of spring 26, the upstanding rectangular flange 21 of closure member 20 always projects above the opening 18 in the lid front wall 17.

Fig. 4 shows the closure member in its operative or closed position in which its plate-like terminal portion 23 is in registry with and closes off the rectangular opening 14 in housing front wall 13 to prevent the passage of light therethrough. In this position, the window 21 of closure member 20 is located at the end of elongated opening 18, entirely out of registry with the opening 14. To prevent stray light from passing from the window 21 through opening 14, the inner closure member surface bordering said window 21 may be provided with a lining 27 of felt, mohair or the like, this lining 27 extending to the housing front wall 13.

A stop plate 28 is fixed to the inner surface of the front wall 17 of lid 15. This stop plate 28 is sized to fit within the space between the shoulder 24 and end flange 25 of the closure member 20 when the latter is in its open position shown in Fig. 5 to lock the closure member 20 in this open position as will be later described. In the closed position of Fig. 4, one end of the stop plate 28 is positioned to abut the flange 25 to lock the closure member 20 in its closed position.

The lens element 11 may be of any usual type including shutter mechanism, iris diaphragm, etc. Secured to the rear surface of the lens element is a rectangular mounting block 29 having a central opening 30 in registry with the rear of the lens. The outer surface of block 29 surrounding the opening 30 is provided with a rectangular grooved seat 31 which is sized to receive therein the upstanding rectangular flange 22 of the closure member 20 for mounting the lens element on the closure member. The block 29 also has on either side a pair of aligned grooves 32 sized and positioned to be received between the free ends of the guide flanges 19 on the front wall 17 of lid 15. The grooves 32 each have a flared front end 33 for guiding the flanges 19 into mounted position.

In the closed position of the closure member 20 shown in Figs. 1 and 4, the film casing 10 is effectively sealed against the entrance of light and the lens element 11 is detached therefrom.

When it is desired to insert the lens element 20 to form the completed camera, the lens element mounting block 29 is coupled to the closure member 20 by inserting the upstanding rectangular flange 22 in the rectangular grooved seat 31. The lens element 11 is then pressed inwardly into the elongated opening 18 against the tension of spring 26, and moving the flange 25 downwardly from its position in Fig. 4 to a position in which it is clear of the stop plate 28. The lens element 11 and the attached closure member 20 may then be slid longitudinally along the opening 18 toward the center of the housing 12 until the edge of mounting block 29 strikes and is stopped by the inner terminal edge of the opening 18. This position is shown in Fig. 5 and represents the operative position of the lens element.

As the lens element 11 is slid to its operative position, the guide flanges 19 enter the respective grooves 32 on the sides of mounting block 29 so that when the lens element reaches its operative position the flanges 19 are fully within the grooves 32 and the lens element 11 is firmly mounted on the film casing 10. Simultaneously, as the closure member 20 arrives at the operative position shown in Fig. 5, the upstanding flange 25 which had been riding along the under surface of stop plate 28, snaps up beyond the outer edge of said stop plate 28 under the biasing force of spring 26 to lock the lens element 11 in its operative position. To release this lock in order to remove the lens element 11, the latter must be pressed downwardly until the flange 25 has moved below the stop plate 28.

In the open position of the closure member 20 and the operative mounted position of the lens element 11, the lens opening 30 and window 21 are in registry with the rectangular opening 14 in housing front wall 13, which is in turn in registry with a window 34 in the rear wall of an image chamber 35 which is mounted centrally in the housing 12 against the rear surface of housing front wall 13. The image chamber 35 has end walls spaced from the end walls of the housing 12 to define a pair of film compartments 36 and 37 for holding a roll of film 38. When the shutter of lens element 11 is operated, the picture image is projected through the image chamber 35 and its window 34 onto the film 38 which is distended therebehind in a manner to be presently described.

The film casing 10 also has a removable rear cover 40 having an upstanding peripheral flange 41 which tightly encases the ends of the side and end walls of housing 12. A pair of integral upstanding lugs 42 are provided on opposite sides of the flange 41, each lug 42 having a hole 43. The housing side walls are also provided with perforations 44 positioned to register with the respective holes 43 when the cover 40 is inserted in closed position. After the camera is loaded with film, a pin 45 is inserted in each pair of aligned holes 43 and perforations 44 and a cotter pin 46 is inserted in a diametral hole at the inner end of the pin 45, as shown in Fig. 6, to lock the cover in inserted position until the film is exposed and ready for development.

At one end of the cover 40, the flange 41 has a central, inwardly-extending bearing sleeve 47 in which is slidably mounted a plunger rod 48. A film actuating member 49 is mounted upon the inner end of said plunger rod 48. Said member 49 constitutes a flat plate slidable upon the inner surface of cover 40, and having a pair of upwardly bent flanges 50 through which the end of plunger rod 48 extends and is fixed thereto. The member 49 also has a pair of internal upwardly-bent resilient fingers 51 sized and arranged to engage the sprocket holes of the film contained in the film casing 10 for transporting the film in the casing between exposures.

Also carried by the member 49 is a resilient pawl 52 which is preferably integral with the member 49. The pawl 52 is positioned to actuate a counter disc 53 which is rotatably mounted on the inner surface of cover 40, the counter disc 53 having a series of ratchet teeth 54 engageable by the pawl 52. As shown in Fig. 1, a leaf spring 55 is mounted on the inner surface of cover 40 and is held by its own resiliency in engagement with a ratchet tooth 54 of counter disc 53 to act as a pawl to prevent the counter disc from rotating backward when the actuating pawl 52 is withdrawn therefrom.

On its surface facing the cover 40, the counter disc 53 has imprinted or stamped therein a circular row of numerals 57, shown in Fig. 3, these numerals being arranged to increase in a clockwise direction. By way of example, ten numerals are shown in Fig. 3 from 1 to 0 and corresponding to a length of film suitable for ten exposures. If a longer or shorter roll of film is to be used, the numerals may be varied accordingly. A numeral is provided for each tooth 54 in the counter disc 53, and a circular window 56 is provided in the cover 40 through which one of the numerals is always visible from the outside of the film casing 10.

Associated with the cover 40 is a pressure plate 58 made of resilient sheet metal and having a pair of downwardly-turned flanges 59 and 60 resting upon the inner surface of cover 40 so that the body of pressure plate 58 is spaced above the plunger rod 48, actuating member 49, and counter disc 53. The pressure plate 58 also has a pair of cut-away slots 61 along each side edge to provide clearance for movement of the respective fingers 51 when the plunger rod 48 is actuated. The end flange 59 has a central slot 62 for providing clearance for the turning movement of counter dial 53 while the end flange 60 has a central slot 63 for receiving the bearing sleeve 47. To the outer end of plunger rod 48 projecting outside the cover 40 is secured a finger piece 64 for manual actuation of said plunger rod. The end wall of housing 12 has at its lower edge a slot 65, shown in Fig. 4, said slot 65 being located to snugly receive the bearing sleeve 47 when the cover 40 is inserted on said housing 12.

The window 34 of image chamber 35 is lined around its outer surface with a layer 66 of felt, mohair, or the like to act as a protective surface against which the film slides as it is transported.

The film 38 is the usual 35 mm. film having a row of sprocket holes 66 at each side along its length. The film provided for use in the camera of this invention is of relatively short length, preferably a ten exposure length, and is initially rolled into a small spiral roll and inserted in the film compartment 36 with a small portion drawn over pressure plate 58 in a position to be engaged by the fingers 51 of film-actuating member 49. When the cover is then set in its inserted position, the film 38 is pressed by pressure plate 58 against the soft layer 66 bordering the window 34.

After each exposure, the film is advanced one frame by sliding the plunger rod 48 outwardly until the film-actuating member 49 contacts the sleeve 47 and then sliding the plunger rod inwardly to its original position, the finger piece 64 abutting the flange 41 of cover 40.

It will be noted in Figs. 4 and 5 that the ends of the resilient fingers 51 are upwardly bent, extending through the cut-away slots 61 and projecting a slight distance above the top surface of pressure plate 58. It will also be noted that the ends of the fingers 51 are inclined away from the actuating member 49 and toward the counter disc 53. Because of this inclination and the resiliency of the fingers 51, said fingers operate in the manner of ratchet teeth to engage the sprocket holes 67 of film. When the finger piece 64 is pulled outwardly so that the film-actuating member 49 is slid toward the bearing sleeve 47, the ends of the outwardly-inclined resilient fingers 51 upon engagement with the film sprocket holes 67 will be bent downwardly so that they slip over said sprocket holes and do not move the film. When the finger piece 64 is then pressed inwardly it moves the actuating member 49 toward the counter disc 53, the fingers 51 engaging the sprocket holes 67 being bent upwardly and into firm holding engagement with said sprocket holes. Upon the return of the actuating member, therefore, the film is advanced by a distance corresponding to one exposure frame. At the same time, at each return of the actuating member 49, the counter disc 53 is rotated through an angle corresponding to one indicator numeral 57 by the pawl 52. This one outward and inward movement of finger piece 64 constitutes a cycle for advancing the film by one exposure frame.

As the film 38 is advanced by the actuating member just described, the film leaves the compartment 36 and enters the compartment 37. The compartment 37 is provided with an arcuately-bent resilient guide plate 68 which together with the inherent curling tendency of the film, causes said film to be wound into a spiral roll in compartment 37.

The film casing 10 may be provided with a view finder which may be of any of the usual types.

After the film counter has turned from indicator numeral "1" to numeral "0," the user knows that the entire length of film is exposed, and then detaches the lens element 11. The sliding of the lens element 11 toward the end of the film casing 10 automatically moves the window 21 out of registry with the housing opening 14 and moves the solid plate-like portion 23 of closure member 20 in front of opening 14, thus sealing the film casing 10 against passage of light therein. In this condition, the closed film casing 10 may be given to a dealer or technician for development of the film. In removing the film, the window 21 is manually slid into registry with the housing opening 14 in a darkroom, so that access may be had to the cotter pins 46 located inside housing 46 and the cover 40 may be removed. The casing may then be returned to the user, loaded with a fresh length of film.

The user of the camera assembly may provide himself with two or more film casings, each loaded with different types of film. One for example, may contain color film, the others various types of black-and-white film. The user may take two or three exposures on color film, and then, if he desires to change to black-and-white film, it is only necessary for him to remove the lens element from one casing and insert it on the other.

While a preferred embodiment of the invention has been shown and described herein, it is obvious that numerous additions, changes and omissions may be made in the invention without departing from the spirit and scope thereof.

What is claimed is:

1. A camera assembly comprising a lens element and a hollow film casing, said film casing having a front wall containing an image opening and a closure member mounted in front of said image opening, said closure member having a solid closure portion at one end and a window at the other end, and being mounted to slide parallel to said front wall between a closed position in which the solid closure portion closes off the image opening and an open position in which the window is in registry with the image opening, said lens element and closure member having cooperating means for releasably coupling said lens element and closure member with the lens element in communication with said window for sliding movement of said closure member upon movement of said lens element parallel to said front wall, said film casing also having mounting means located adjacent said image opening and engageable with said lens element for restraining the latter against outward movement forwardly from said closure member when the lens element and the window are moved into registry with said front image opening.

2. A camera assembly comprising a lens element and a hollow film casing, said film casing having a front image opening and a closure member mounted for sliding movement in a longitudinal direction along the front surface of said film casing and located in front of said image opening, said closure member having a solid closure portion at one end and a window at the other end and being slidable between a closed position in which the solid portion closes off said image opening and an open position in which said window is in registry with said image opening, said lens element being insertible on said closure member in communication with the window thereof when said closure member is in its closed position, said lens element and closure member having cooperating means for releasably coupling said lens element to said closure member upon insertion of the lens element for sliding movement of said closure member toward its open position when said lens element is moved manually along the front surface of said film casing into registry with said image opening, said film casing having mounting means located adjacent said image opening and engageable with said lens element for releasably holding the latter against outward movement from its inserted position when said lens element and the coupled closure member are moved to said open position.

3. A camera assembly comprising a lens element and a hollow film casing, said film casing having a central image opening and a plate-like closure member mounted for sliding movement in a longitudinal direction along the front surface of said film casing and located in front of said image opening, said closure member having a solid plate portion at one end and a window at the other end and being slidable between a closed position in which the window is located adjacent one end of the film casing and the solid plate portion is located in front of said image opening, and an open position in which the window is in registry with the central image opening, said window having an upstanding flange therearound and said lens element having a recessed groove in its bottom surface for receiving said flange when said lens element is inserted on the flange of said closure member in its closed position for sliding movement of said closure member toward its open position when said lens element in its inserted position on said flange is moved in a longitudinal direction along the front surface of said film casing toward said image opening, said film casing having mounting means on its front surface adjacent the central image opening for receiving and holding said lens element against outward movement forwardly from said closure member when said lens element and the coupled closure member are moved to said open position.

4. A camera assembly according to claim 3 in which said mounting means comprises a pair of upstanding flanges of inverted L-shape mounted on the front surface of said camera casing, on opposite sides of said image opening, said lens element having cooperating grooves for receiving said flanges as the lens element is moved into registry with said image opening.

5. A camera assembly according to claim 3 in which said closure member is made of resilient material and has a transverse flange at the end of said solid plate portion, said camera having a fixed stop plate engageable with said flange to releasably lock said closure member in its open and closed positions, said closure member being movable transversely through a distance sufficient to enable the flange to clear said stop plate.

6. A camera assembly comprising a lens element and a hollow film casing, said film casing including a front wall which has an image opening and a slide member mounted for sliding movement along said front wall, said slide member having a solid closure portion at one end and a window at the other end and being slidable between a closed position in which the solid closure portion closes off the image opening and an open position in which the window is in registry with the image opening, said slide member having mounting means adjacent said window which cooperates with mounting means on the lens element for removable mounting of said lens element on said closure member in registry with said window, said films casing having a bracket located adjacent said image opening positioned to engage a portion of said lens element when said closure member with the lens element mounted thereon is slid toward said image opening to its open position, whereby said bracket restrains said lens element from lateral outward movement forwardly from said front wall.

7. A camera assembly comprising a lens element and a hollow film casing, said film casing including a front wall which has an image opening and a closure plate mounted for sliding movement along said front wall, said closure plate having a window therein and being slidable between an open position in which said window is in registry with said image opening and closed position in which said closure plate covers said image opening, said closure plate having an upstanding flange bordering said window, said lens element having a slot sized to receive said flange for removable mounting of said lens element on said closure plate in registry with said window, said film casing having bracket members located on opposite sides of said image opening and positioned to receive a portion of said lens element when said closure member with the lens element mounted thereon is slid toward said image opening to its open position, whereby said bracket restrains said lens element from lateral outward movement forwardly from said front wall.

References Cited in the file of this patent

UNITED STATES PATENTS

| 1,265,699 | Thomas | May 7, 1918 |
| 2,043,612 | Frost et al. | June 9, 1936 |
| 2,257,424 | Meyer | Sept. 30, 1941 |
| 2,320,441 | Lessler | June 1, 1943 |
| 2,620,712 | Clifford | Dec. 9, 1952 |
| 2,655,084 | Roehrig | Oct. 13, 1953 |

FOREIGN PATENTS

| 59,726 | The Netherlands | Aug. 15, 1947 |